United States Patent [19]
Fontana

[11] Patent Number: 5,497,386
[45] Date of Patent: Mar. 5, 1996

[54] OPTICAL-FIBRE PASSIVELY MODE LOCKED LASER GENERATOR WITH NON-LINEAR POLARIZATION SWITCHING

[75] Inventor: Flavio Fontana, Cormano, Italy

[73] Assignee: Pirelli Cavi S.p.A., Milan, Italy

[21] Appl. No.: 306,368

[22] Filed: Sep. 15, 1994

[30] Foreign Application Priority Data

Sep. 16, 1993 [IT] Italy .................................. MI93A1996

[51] Int. Cl.$^6$ ................................................ H01S 3/098
[52] U.S. Cl. .................................. 372/18; 372/6; 372/21; 372/27; 372/102
[58] Field of Search .................................. 372/18, 6, 21, 372/27, 102, 26, 99, 106, 39, 41

[56] References Cited

U.S. PATENT DOCUMENTS

| | | | |
|---|---|---|---|
| 5,255,274 | 10/1993 | Wysocki et al. | 372/26 |
| 5,317,575 | 5/1994 | Aniano | 372/6 |
| 5,319,652 | 6/1994 | Moeller et al. | 372/6 |
| 5,381,426 | 1/1995 | Fontana et al. | 372/18 |

OTHER PUBLICATIONS

Optic Letters, vol. 14, No. 22, Nov. 15, 1989 "Mode–locked Erbium–doped Fiber Laser with Soliton Pulse Shaping"; J. D. Kafka et al.; pp. 1269–1271.
Electronics Letters, vol. 26, No. 3, Feb. 1, 1990 "30 GHz Picosecond Pulse Generation From Actively Mode–Locked Erbium–Doped Fibre Laser"; A Takeda et al.; pp. 216–217.
Electronics Letters, vol. 27, No. 3, Jan. 31, 1991 "Single–Frequency Travelling–Wave Erbium–Doped Fibre Loop Laser"; J. G. Cowle et al.; pp. 229–230.
Electronics Letters, vol. 27, No. 6, Mar. 14, 1991 "Selfstarting, Passively Mode–Locked Erbium Fibre Ring Laser Based on the Amplifying Sagnac Switch"; D. J. Richardson et al.; pp. 542–543.
Electronics Letters, vol. 27, No. 6, Mar. 14, 1991 "Subpicosecond All–Fibre Erbium Laser"; I. N. Duling, III; pp. 544–545.
Electronics Letters, vol. 27, No. 9, Apr. 25, 1991 "320fs Soliton Generation with Passively Mode–Locked Erbium Fibre Laser"; D. J. Richardson et al.; pp. 730–732.
Optics Letters Feb. 16, 1991 No.4, N.Y. "Additive–pulse–compression mode locking of a neodymium fiber laser"; Fermann, et al.; pp. 244–246.
Electronics Letters, vol. 28, No. 20, Sep. 24, 1992 "High Repetition Rate Figure Eight Laser with Extracavity Feedback," Dennis et al.; pp. 1894–1896.
Technical Physics Letters May 19, 1993, N.Y. "Linear Er$^{3+}$ Fiber Laser with Passive Mode Locking Through Self–induced Rotation of the Polarization Ellipse"; Petrov et al.; pp. 303–304.
Electronics Letters Jul. 22, 1993, No. 15, Stevenage, Herts., GB, "Continuum Suppressed, Uniformly Repetitive 136fs Pulse Generation From An Erbium–doped Fibre Laser with Nonlinear Polarisation Rotation", Nakazawa, et al.; pp. 1327–1329.
Electronics Letters Nov. 5, 1992, No. 23, Stevengage, Herts., GB "Subpicosecond Soliton Pulse Formation From Self–Mode–Locked Erbium Fibre Laser Using Intensity Dependent Polarisation Rotation"; Noske et al. European Search Report Feb. 25, 1994, pp. 1–2.

*Primary Examiner*—Leon Scott, Jr.
*Attorney, Agent, or Firm*—Finnegan, Henderson, Farabow, Garrett and Dunner

[57] ABSTRACT

A passively-mode-locked laser generator having an active optical fibre and fibre pumping means adapted to cause the generation of an emission signal in the fibre, a polarization control means, signal extraction means and at least one optical component with transmissiveness depending on polarization is disclosed. The components are inserted in an optical fibre path that, for a pumping energy lower than a predetermined value corresponding to a linear propagation condition of the signal, gives rise to a polarization rotation of the emission signal through an angle causing the extinction of the signal itself within the optical component with transmissiveness depending on polarization. For a pumping energy of a higher power than the predetermined value, the generator causes a polarization rotation of the emission signal through an angle corresponding to the transmission with low losses of only pulses of high peak power of the emission signal.

23 Claims, 3 Drawing Sheets

OPTICAL-FIBRE PASSIVELY MODE LOCKED LASER GENERATOR WITH NON-LINEAR POLARIZATION SWITCHING

BACKGROUND OF THE INVENTION

1. Field of the Invention

The present invention relates to laser generators for optical fibre transmission systems, and more particularly to the laser emission of solitons using an erbium-doped active fibre with passive mode locking and non-linear polarization switching.

2. Discussion of the Related Art

Under many circumstances in the telecommunications field it is desirable to obtain pulsated laser emissions of a particularly limited duration. Pulses of the above kind having a duration $\delta t<100$ ps, commonly referred to as ultrashort pulses, or "solitons" under guided propagation conditions, apply for example in the field of high speed digital telecommunications (up to 10 GBit/s), for making optical instruments, carrying out tests on semiconductor components and also making remote measurements, in topography or in the atmospheric-radar field, for example.

To this end, optical-fibre laser devices using erbium-doped optical fibres are known, in which an active modulating device of the electro-optical type is inserted in an optical path forming a laser cavity so as to enable propagation and amplification of the desired pulses alone. Such devices are commonly referred to as mode-locked devices of the active type, because the modulating device present therein and operated from the exterior acts on the modes generated in the laser, thus enabling amplification as far as a level supporting the laser emission in the selected modes alone. Devices of the above kind are for example described in OPTICS LETTERS vol. 14, No. 22, Nov. 15, 1989, pages 1269–1271 by J. D. Kafka, T. Baer and D. W. Hall, in ELECTRONICS LETTERS, vol. 26, No. 3, Feb. 1, 1990, pages 216–217, by A. Takada and H. Miyazawa, and in PROCEEDINGS OF II TOPICAL MEETING ON OPTICAL AMPLIFIERS, Optical Society of America, 1991, Snowmass Village, Colo., U.S., pages 116–119, by T. Pfeiffer and H. Schmuck (SEL Alcatel Research Centre).

Also known are mode-locked pulse laser generators of the passive type comprising optical-fiber laser devices (a "figure-of-eight" laser) in which a non-linear amplifier loop mirror (NALM) is employed which is connected to a unidirectional loop to make a laser in which mode-locking is generated in the absence of external drive means. In the above devices, the non-linearity of the amplifier loop, when the highest luminous intensities occur, causes a light deviation from one inlet fibre to the other at the unidirectional loop. In this manner, the system exhibits lower losses at higher luminous intensities than at lower luminous intensities, so that only pulses of greater intensity are maintained. This condition forces the laser to operate in a pulsated manner. Devices of this kind are described in ELECTRONICS LETTERS; Vol. 27, No. 6, Mar. 14, 1991, pages 542–543, by D. J. Richardson, R. I. Laming, D. N. Payne, V. Matsas, M. W. Phillips, in ELECTRONICS LETTERS, Vol. 27, No. 9, Apr. 25, 1991, pages 730–732 by the same authors, and in ELECTRONICS LETTERS, Vol. 27, No. 6, Mar. 14, 1991, pages 544–545, by I. N. Duling.

Theoretical foundations concerning mode-locking both of the active and passive type are disclosed, for example, in WAVES AND FIELDS IN OPTOELECTRONICS, by Herman A. Haus, issued in 1984 by Prentice-Hall, Inc., Englewood Cliffs, N.J., pages 254–290. In ELECTRONICS LETTERS, Vol. 27, No. 3, Jan. 31, 1991 pages 229–230, G. J. Cowle and D. N. Payne describe a loop laser device comprising a selective reflector or mirror, a directional coupler, a polarization controller, an erbium-doped optical fibre and an optoisolator, disposed so as to form a resonant cavity. Such a device is specifically provided for continuous operation in a longitudinal mono-mode.

SUMMARY OF THE INVENTION

The present invention concerns an active-fibre laser that is passively-mode-locked and particularly suited for emission of solitons.

In an aspect the present invention concerns an active-fibre passively-mode-locked laser generator comprising an active optical fibre doped with a fluorescent dopant; means for feeding luminous pumping energy to one end of the active fibre, the pumping energy being adapted to excite the active-fibre fluorescent dopant to a laser emission state such that the dopant may decay to a base state with a luminous emission to a predetermined wavelength constituting an emission signal of pulses of different peak powers, of a value depending on the pumping energy. The laser generator further comprises a polarization control means for orienting the polarization of the emission signal in a predetermined plane; an optical feedback device connected to the ends of the active fibre; at least one optical component with transmissiveness depending on polarization; and means for extracting the emission signal from the active fibre, in which at least the active fibre, polarization control means, feedback means and optical component with transmissiveness depending on polarization are components of an optical fibre path in which the emission signal propagates and in which at least one portion of the emission signal present at one end of the active fibre is sent back to the interior of the fibre.

The laser generator of the present invention is characterized in that the components of the optical path have an orientation that, on the whole, gives rise to a rotation of the polarization of the emission signal which, in case of pumping energy lower than a predetermined value causing a linear-condition propagation of the emission signal in the optical path, takes place through an angle corresponding to the extinction of the emission signal within the optical component with transmissiveness depending on polarization and to the consequent absence of emission signal in the extraction means. In the case of pumping energy of higher power than the predetermined value, rotation takes place through an angle corresponding to the transmission with low losses within the optical component of the only pulses of high peak power of the emission signal.

According to a further aspect, the present invention comprises a method of generating passively-mode-locked stimulated pulses in an optical-fibre laser generator comprising the steps of providing an active optical fibre doped with a fluorescent dopant; feeding luminous pumping energy to the active fibre, the pumping energy being adapted to excite the fluorescent dopant to a laser emission state such that the dopant may decay to a base state with a luminous emission to a predetermined wavelength constituting an emission signal; orienting the polarization of the emission signal in a predetermined plane; providing an optical feedback device connected to ends of the active fibre; providing at least one optical component with transmissiveness depending on polarization; extracting the emission signal from the active fibre; and forming an optical fibre path in which the emission signal propagates and in which at least one portion of the emission signal present at one end of the active fibre is sent back to the interior of the fibre.

The method further includes the steps of adjusting the polarization to a configuration causing the absence of an emission signal coming out of the extracting means in a linear propagation condition of the emission signal within the optical path and supplying the active fibre with a pumping power corresponding to the stimulated emission, in the active fibre of an emission signal having a luminous power higher than a predetermined value, corresponding to non-linear luminous-propagation conditions of the emission signal in the optical path, while keeping the configuration of the polarization control means constant.

BRIEF DESCRIPTION OF THE DRAWINGS

The manner by which the above object and other objects, features, and advantages of the present invention are attained will be fully apparent from the detailed description when considered with reference to the accompanying drawings, in which.

DETAILED DESCRIPTION

Figure 1:
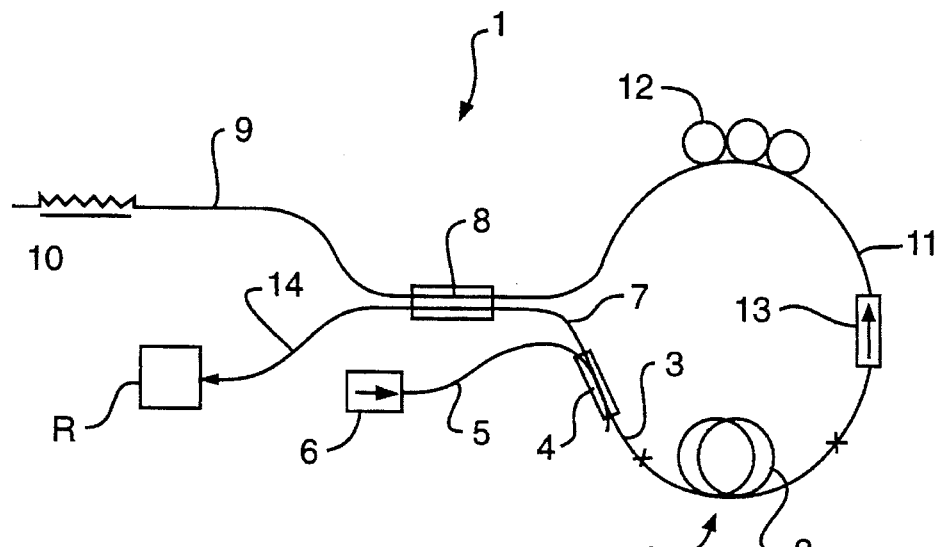
FIG. 1 is a diagram of a passively-mode-locked laser device according to one embodiment of the invention.

In accordance with the present invention, it has been found that a laser emission having very short pulses, i.e. <100 ps, can be achieved with a fibre laser using an erbium-doped active optical fibre with a passive mode locking, by the use of non-linear-polarization rotation devices within the resonant cavity, in the presence of a narrow-band reflector means responsive to polarization. In particular, it has been found that a laser system comprising polarization controlling members and a narrow-band reflector means responsive to polarization, in which the members are selected and disposed according to a particular configuration, enables the pulsated operation of the assembly to be achieved and a continuous-emission operation to be stopped, and under such a condition enables the very short pulses to be generated in the absence of active modulator devices or saturable absorbing elements.

In a particular embodiment of the active-fibre passively-mode-locked laser generator in accordance with the present invention, the means supplying luminous pumping energy comprises a laser emitter of a pumping wavelength, connected through a respective optical fibre to an inlet of a dichroic coupler having one outlet at which the pumping energy and emission signal are coupled, and having an inlet for the emission signal. The predetermined value of the pumping power is included within an adjustment field of the emission power of the pumping laser emitter, and preferably in the range of 7 to 10 mW.

In a preferred embodiment of the invention, the polarization rotation means of the emission signal travelling through the active fibre comprises at least one optical-fibre turn, serially connected in the optical fibre path, with a lying plane of adjustable orientation relative to the remaining portion of the optical path itself. Alternatively, the polarization rotation means of the emission signal travelling through the active fibre comprises a liquid-crystal polarization controller or a planar-optics polarization controller. Preferably, the optical component having transmissiveness depending on polarization has a polarization selectivity greater than 10%.

In one embodiment, the optical component with transmissiveness depending on polarization is a Bragg grating reflector. Alternatively, said optical component with transmissiveness depending on polarization is a polarizer.

In a preferred embodiment, the optical fibre path comprises an active fibre having one end connected to one inlet of a directional coupler which has a second inlet connected to a second end of the active fibre, one outlet connected to a selective reflector, with transmissiveness depending on polarization, and a second outlet constituting the extraction means of the emission signal. A unidirectional optoisolator is interposed between the first and second inlets of the directional coupler in series with the active fibre. The means for controlling and adjusting the polarization rotation is interposed in said optical fibre path at an intermediate position between one of the active-fibre ends and selective reflector, and the means for supplying pumping energy is serially interposed within the optical fibre path connected to one of the ends of the active fibre.

In an alternative embodiment, the optical fibre path comprises an active fibre having one end connected to a wide-band reflector and a second end connected to the inlet of the selective reflector, with transmissiveness depending on polarization. The means for controlling and adjusting the polarization rotation is inserted within the optical path at an intermediate position between the selective reflector and wideband reflector. The means for supplying pumping energy is serially interposed within the optical fibre path and is connected to one of the ends of the active fibre.

According to a further alternative embodiment, the optical fibre path comprises an active fibre connected in a closed circuit comprising the means for controlling and adjusting the rotation of polarization, a polarizer, a unidirectional optoisolator, means for supplying pumping energy connected to one of the ends of the active fibre, and a directional coupler for extracting the emission signal. Preferentially, the fluorescent dopant of the active fibre is erbium. More preferentially, the means for supplying luminous pumping energy has an emission of 980 nm pumping wavelength, and the predetermined wavelength of the emission signal is in the range of 1530 to 1560 nm.

Preferably, the method of generating stimulated passively-mode-locked pulses in accordance with the invention includes the steps of supplying the active fibre with a pumping power corresponding to the stimulated emission, in the active fibre of an emission signal having a luminous power lower than a predetermined value, corresponding to linear luminous-propagation conditions of the emission signal in the optical path; controlling the presence of the emission signal coming out of the extraction means; adjusting the polarization control means in a configuration causing the absence of an emission signal coming out of the extraction means; and increasing the pumping power supplied to the active fibre as far as a second predetermined value is overcome. The second value corresponds to non-linear luminous-propagation conditions of the emission signal in the optical path in which the polarization of the emission signal is rotated at right angles to that in the linear propagation conditions, while keeping the configuration of the polarization control means constant.

In particular, the pumping power is adjustable between a predetermined minimum and maximum values, in which the minimum value is lower than a value corresponding to the stimulated emission of the active fibre propagating in a linear condition in the optical path and the maximum value is higher than a value corresponding to a stimulated emission in the active fibre corresponding to non-linear conditions of luminous propagation of the emission signal in the optical path in which the polarization of the emission signal is rotated at right angles to that in the linear propagation conditions. Preferentially, the predetermined minimum value of the pumping power is lower than or equal to 7 mW, and the predetermined maximum value of the pumping power is greater than or equal to 10 mW.

In a preferred embodiment, the polarization control means includes at least one optical fibre turn serially connected in the optical fibre path and capable of spatial orientation. The arrangement of the polarization control means itself in a configuration causing the absence of an emission signal from the signal extraction means is accomplished by varying the spatial orientation of the optical fibre turn or turns.

Reference will now be made in detail to the present preferred embodiments of the invention, examples of which are illustrated in the accompanying drawings.

An experiment for producing a passively-mode-locked laser in accordance with the invention has been executed with the use of a device having the configuration shown in FIG. 1. The laser, generally denoted by 1, comprises an erbium-doped active fibre 2. Connected to one end of the fibre 2 is the trailing fibre 3 of a dichroic coupler 4 having one leading fibre 5 connected to a pump laser 6 and a second leading fibre 7 connected to a directional coupler 8. The fibre 9 coming out of the directional coupler 8 is connected at its end opposite to the coupler, to a polarization-selective reflector 10.

The end of the active fibre 2 on the other side from the dichroic coupler 4 is connected, through an optical fibre 11, to the directional coupler 8, in the same direction as the fibre 7. A control polarization element 12 and an optoisolator 13 are interposed along the fibre 11. The optical fibre 14 coming out of the directional coupler 8 constitutes the outgoing fibre of the laser, to which a receiving apparatus R has been connected through which the emissions of laser 1 have been analyzed.

Fibres 7, 2, and 11 together form a loop A that, in conjunction with the reflector 10, constitutes a loop laser structure. The overall length of the loop A was about 27 m for the experiment. The features of the active fibre 2 of the experiment carried out are the following:

| fibre length | 10 m |

| | |
|---|---|
| fibre type | Si/Ge |
| Numerical aperture $(n_1^2 - n_2^2)^{1/2}$ | NA = 0.19 |
| Cutoff wavelength (LP11 cut-off) | $\lambda_n$ = 900 nm |
| Erbium content in the core | 100 ppm |

The present invention is not limited to these parameters.

The dichroic coupler 4 is a fused-fibre coupler formed with mono-mode fibres of both 980 and 1536 nm wavelength, with variation of the optical output power depending on a polarization <0.2 dB. The fused coupler has been expressly made of fibres having the features of the above indicated active fibre 2 (apart from the erbium content, erbium being absent). Dichroic couplers of the stated type are known and produced for example by GOULD Inc., Fibre Optic Division, Baymeadow Drive, Glen Burnie, Md. (U.S.), and SIFAM Ltd., Fibre Optic Division, Woodland Road Torquay Devon (GB). The limitation stated for sensitivity to polarization is intended to avoid couplers more sensitive to polarization. In the presence of thermal variations or mechanical stresses causing a polarization variation in the emission of the pump laser 6, emission instabilities will occur.

The pump laser 6 is a laser of a type known as "Strained Quantum Well", having the following features:

| | |
|---|---|
| Emission wavelength | $\lambda_p$ = 980 nm |
| Maximum optical output power | $P_u$ = 35 mW. |

The optical output power of the pump laser is adjustable from 0 to 35 mW by a known low-noise feed circuit. Lasers of the above type are for example produced by DAVID SARNOFF RESEARCH CENTER, Washington Rd, Princeton, N.J. (U.S.).

The directional coupler 8 is a device adapted to divide an optical signal present at one of its inlets into predetermined proportions at the outlets thereof. The directional coupler employed in the described experiment is a commercial type having a 50/50 division ratio, for example a model 1550 POH 50/50 2×2 produced by the above mentioned company Gould Inc.

The selective reflector 10 is a Bragg grating reflector made of optical fibre and having the following features:

| | |
|---|---|
| Reflectivity | 35% |
| Reflected wavelength | $\lambda_r$ = 1531 nm |
| Bandwidth | 0.7 nm |
| Polarization selectivity | 25% |

Figure 2:
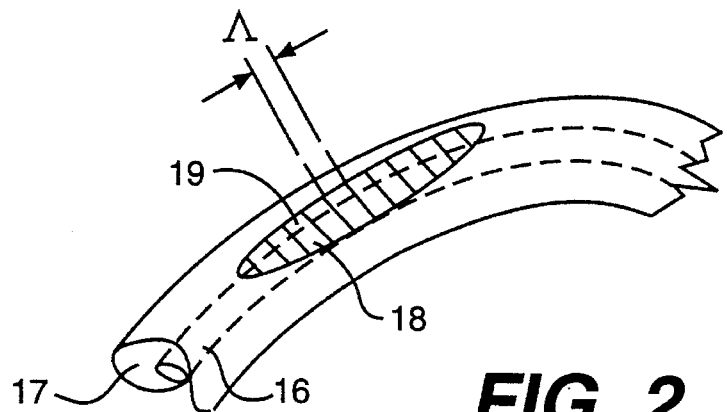
FIG. 2 is an enlarged perspective diagram of a selective Bragg grating reflector.

The Bragg grating reflector substantially consists of a portion of optical fibre 15, shown in FIG. 2, the core 16 and cladding 17 of which have been partly removed over a length thereof, forming a surface 18 on which several parallel wavings 19 have been formed by a photochemical process. The wavings are transverse to the longitudinal axis of the fibre and have a pitch correlated with the reflected wavelength A by the relation:

$$\lambda = 2 n_e \Lambda,$$

wherein $n_e$ is the real refraction index of the fibre mode. "Polarization selectivity" is intended to mean the percent ratio, for a reflecting component, between the reflectivity in the most unfavoured polarization plane (minimum reflectivity) and the reflectivity in the polarization plane perpendicular to the preceding one (maximum reflectivity). "A component passed through by a luminous signal" is intended to mean the percent ratio between the luminous power passing through the component in the most favoured polarization plane (maximum transmissiveness) and the luminous power passing through the component in the polarization plane perpendicular thereto (minimum transmissiveness).

Reflectors of the above type are available on the market from: UNITED TECHNOLOGIES PHOTONICS, Silver Lane, East Hartford, U.S. In the reflector used, the width of the reflected band was 0.05 nm, at a 1536 nm wavelength $\lambda$ corresponding to a grating pitch $\Lambda$ of about 500 nm. The fibre coming out of the reflector 10 on the other side from the fibre 9, may be cut obliquely so as to be non-reflecting.

Fibres 11, 7, 9, and 14 are mono-mode optical fibres type 8/125 (in which 8 represents the core diameter and 125 the cladding diameter in the fibre, reproduced in μm), the core being doped with germanium and having a numerical aperture NA=0.13. Fibres of this type are commercially available and are commonly known to one of ordinary skill in the art.

Figure 3:
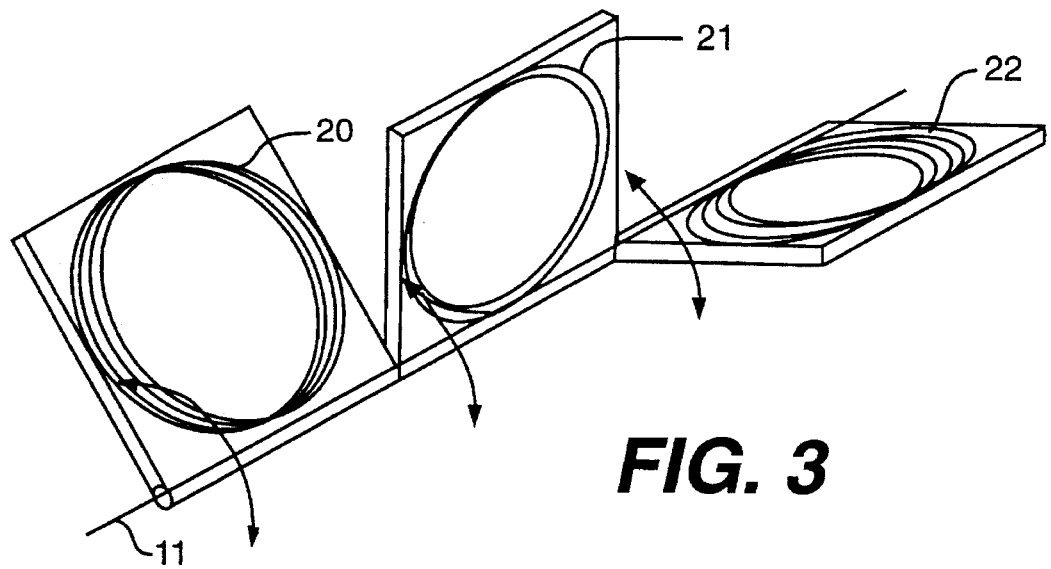
FIG. 3 is a perspective diagram of a polarization selector.

The polarization control element 12 shown in FIG. 3 includes three optical-fibre coils 20, 21, and 22. Each coil is formed with several turns disposed in succession and supported according to an adjustable orientation so that they can be oriented in different planes through rotation relative to a common alignment axis. In the embodiment shown, coils having 4, 2 and 4 turns, respectively, have been used, the diameter of the coils being 6.32 cm, and the coils being made of an optical fibre having the same features as the above-described optical fibres 11, 7, 9, and 14. The turn orientation has been determined experimentally relative to the overall transmissive features of the loop. Devices of the above type can be made expressly using the fibres of the laser loop. Otherwise commercially available devices can be employed, for example produced by GEC MARCONI MATERIALS TECHNOLOGY Ltd, Caswell, Towcester Northants NN12 8EQ (Great Britain).

While polarization control element is preferably made of adjustable turns, as above described, for specific application features of other types of polarization controllers may be also used, such as liquid-crystal controllers, available from ADVANCED OPTRONICS Inc., 2121-B Ringwood Ave., San Jose, Calif., U.S., or planar optics controllers or the like, by which the desired polarization adjustment of the signal circulating in the laser cavity may be achieved.

The optoisolator 13 is a polarization control optoisolator of a type independent of the polarization of the transmission signal having an isolation greater than 35 dB and a reflectivity lower than −50 dB. The isolator used is a model MDL I-15 PIPT-A S/N 1016 produced by ISOWAVE, 64 Harding Avenue, Dover, N.J., U.S. The receiving apparatus R consists of an auto-correlator, type FR- 1 3KR, produced by FEMTO-CHROME INC., U.S.

The described apparatus was tested as follows. The pump laser 6 was operated until emission of a power equal to about 8 mW was achieved, and the receiver R detected a laser emission at 1536 nm of a power slightly higher than the spontaneous emission level (about 15 μW). The polarization control element 12 was then adjusted to switch off the observed laser action completely, and the absence of a receiving signal at the receiver R was ascertained. To this end, turns 20, 21, and 22 were oriented so that at the receiver R no signal should be detected at an optical pumping power approximately corresponding to 6–7 mW (that is slightly higher than the threshold power, in which the active fibre gain exceeds the losses thereof). The pump power was then increased to a maximum value of 35 mW, and after a transient of some tens of μs, a stable condition of pulse emission at a constant frequency of 7.8 MHz and a duration of about 10 ps was observed; at the maximum power (35 mW) of the employed pump the detected emission power was equal to about 5 mW. The width δt of the emitted pulses was calculated as corresponding to about 50 ps.

Figure 4:
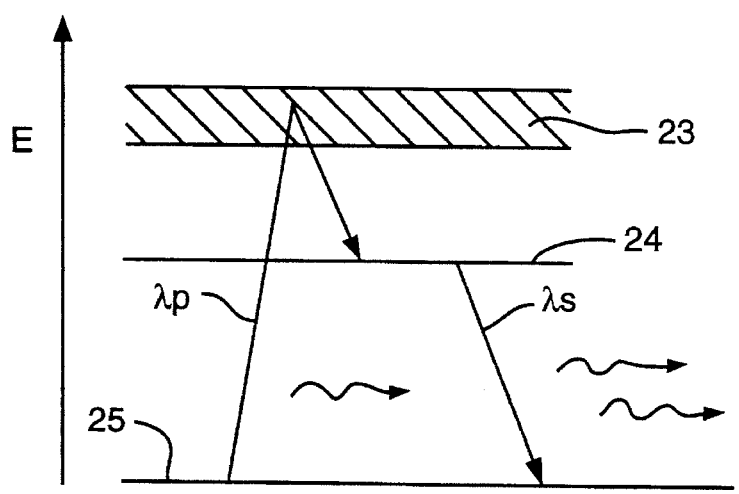
FIG. 4 is a diagrammatic view of the energy transitions of a three-level laser system.

The observed phenomenon can be interpreted as follows. On operation of the pump laser 6 above the threshold power of 6–7 mW, the active fibre 2 begins emitting luminous signals following the spontaneous transition of erbium present therein from the laser-emitting energy level to the base state. As shown in the diagram of FIG. 4 relating to a fibre of the above type symbolically representing the available energy states for an erbium ion in solution in the fibre silicon matrix, the admission of luminous energy at the "pumping" wavelength $\lambda_p$ into the active fibre brings a certain number of $Er^{3+}$ ions present as the doping substance in the fibre glass matrix to an "excited" energy state 23, named the "pumping" band, from which ions spontaneously decay to an energy level 24, forming the laser emitting level. In the laser emitting level 24, $Er^{3+}$ ions can stand for a relatively long period before undergoing a spontaneous transition to the base level 25. As known, whereas transition from band 23 to level 24 is associated with an emission of the thermal type which is dispersed outside the fibre (phononic radiation), the transition from level 24 to the base level 25 is associated with a luminous emission having a wavelength $\lambda_s$ corresponding to the energy value of the laser emitting level 24.

The spontaneous decay of erbium atoms from the laser level to the base level then generates a luminous emission at the wavelength $\lambda_s$. If the active fibre at the laser emission level contains a number of ions higher than at the base level, photons emitted by spontaneous decay are more likely, while travelling through the fibre, to encounter ions at the laser level rather than at the base level, by which ions they will be absorbed. Therefore, a stimulated ion transition from the laser level to the base level is caused before spontaneous decay to give rise to a cascade phenomenon producing at the exit of the active fibre a signal consistent with the wavelength $\lambda_s$.

Figure 5:
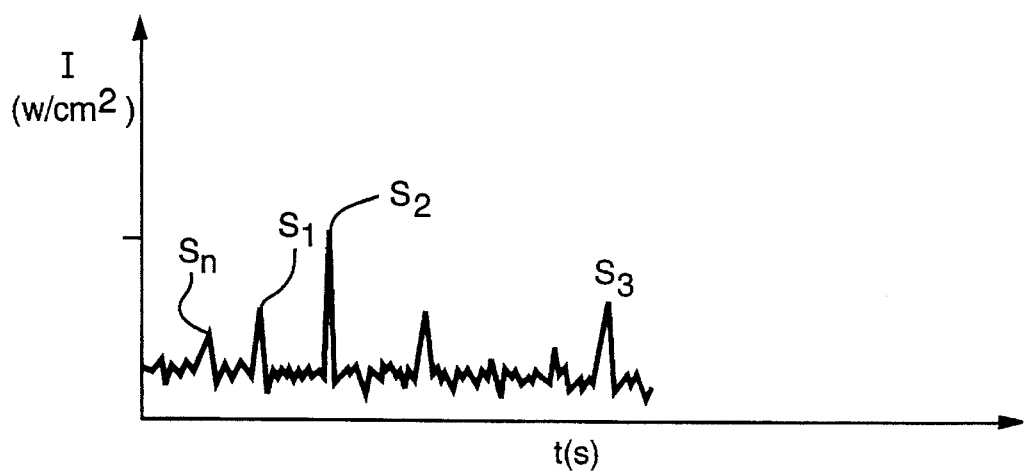
FIG. 5 is a diagram showing the luminous intensity emitted from the active fibre in the absence of non-linearity effects.

On the whole, the transitions generated within the active "pumped" fibre produce several signal components at the same wavelength $\lambda_s$. The transitions produce by interference an emission having several peaks S1, S2, S3, and Sn with different polarizations and intensities, as qualitatively shown in the diagram in FIG. 5. The signal coming out of the active fibre 2 travels through the loop formed by the fibre 11 and reaches the directional coupler 8, a fraction thereof (50% with the described apparatus) being sent to the selective reflector 10. The reflected signal comes back to the directional coupler 8 and the signal fraction that is routed to the fibre 7 is again fed to the active fibre 2. The photons at the wavelength $\lambda_s$ encounter new erbium atoms excited to the laser emission level by the administered pumping energy and cause the decay thereof, with the associated consistent emission and further amplification of the signal itself, thereby giving rise to the laser emission. The signal fraction routed to the fibre 11 in an opposite direction relative to that allowed by the isolator 13, is stopped by the isolator.

The selective reflector 10 is a selective polarization device, which means that the reflection of a signal varies depending on the polarization state of same. In particular, the selective reflector used had a 25 dB reduction in the reflected power, with a luminous signal having a polarization perpendicular to the optimal one.

The polarization selector 12, by suitable rotations of the lying planes of the turns 20, 21, 22 to be determined experimentally, enables the polarization plane of the signal travelling through the fibre 11 and sent to the selective reflector 10 to be modified. The double refraction features of the fibres forming the laser loop A together with the geometrical configuration of the loop cause a polarization rotation of the light travelling through the loop itself, as described for example by G. P. Agarwall, NON LINEAR FIBER OPTICS, Academic Press, Inc., Harcourt Brace Ivanovich, Publishers, U.S.

The polarization selector 12 may be used in order to achieve an overall zero polarization rotation of a signal travelling through the loop. If the orientation of the polarization selector 12 is selected so that it may be able to compensate for the effect resulting from the double refraction of the loop fibres, the reflected component from the selective reflector 10, after travelling through the whole loop, comes back to the reflector 10 with the same starting polarization plane. In this manner the signal component can be reflected again, and by subsequent passages through the active fibre 2 it is increasingly more amplified, thereby generating a continuous laser emission at constant frequency. This operating condition substantially corresponds to that of the device disclosed in ELECTRONICS LETTERS, Vol. 27, Jan. 31, 1991, pages 229–230.

According to the present invention, if the orientation of the polarization selectors is on the contrary selected such that it causes a 90° polarization rotation of the signal travelling through the loop, the signal component of a low density signal (that is having a low pumping power) initially possessing a polarization state adapted to be reflected from the selective reflector 10, is reflected by the reflector and travels through the loop A again. As a result, the signal undergoes a 90° polarization rotation and arrives again at the reflector 10 with a polarization plane in which no reflection occurs. The orientation condition of the polarization selector with a 90° polarization rotation in the travel path of the loop thus causes the complete absence of laser emission.

"Low density signal" is intended to mean a signal that does not considerably alter the refraction index of the fibre. By way of example, a signal having this intensity corresponds to a power $P \leqq =2$ mW. (The signal intensity is $I=P/A_f$, where $A_f$ is the fibre area).

By "low pumping power" it is intended a power slightly higher than the threshold power, that is higher than the power capable of triggering the laser effect, but insufficient to generate an intensity laser signal. By way of example, in the experimented configuration, this low pumping power was about 6–7 mW. Generally, the intensity of the laser signal emitted increases substantially proportionally with the pumping power.

In accordance with the invention, however, it has been found that by increasing the pumping power fed to the active fibre 2 beyond the above minimum value, without modifying the preselected configuration of the polarization selector in order not to generate a laser emission of low pumping power, it is possible to obtain the emission of the so-called ultrashort pulses or "solitons." Solitons are pulses having a lower duration than 100 ps, having high power (approx. >1 mW), and being capable of propagating unaltered (that is without distortion) through mono-mode optical fibres.

This phenomenon is deemed to be due to the occurrence of non-linear phenomena of luminous propagation in the fibre, as a result of the variation of the refraction index in the fibre depending on the luminous intensity of the signal passing through it. The variation in the refraction index of a transparent means depending on the luminous intensity of the signal passing through it is given by:

$$\Delta = n_2 |E^2| = YI,$$

wherein $n_2$ is reproduced in electrostatic units, E is the electric field in electrostatic units, and Y is a constant reproduced in cm$^2$/W. In each polarization plane one can write:

$$n_x = n_o + \alpha\, E_x E_y$$

$$n_y = n_o + \alpha'\, E_x E_y$$

etc.

Figure 6:
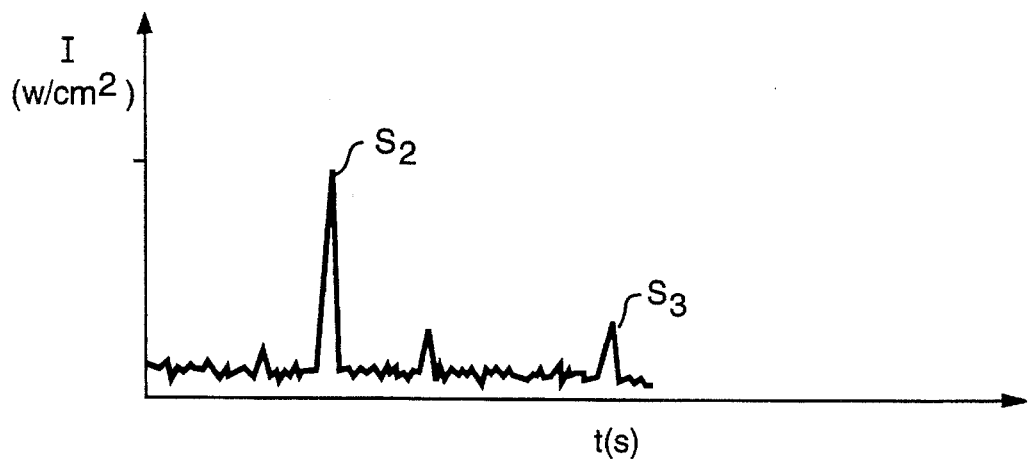
FIG. 6 is a diagram showing the luminous intensity emitted from the active fibre in a transient step on the occurrence of non-linearity effects.

As can be seen from the preceding equations, in the presence of low-intensity signals, that is electric fields of low value, the refraction indices stand substantially constant and of same value. The variation in the refraction index occurring with pulses of greater intensity, on the contrary, generates a different variation of the polarization plane on travelling through the loop A, which variation may reach such a value to compensate for the 90° polarization rotation previously selected by the polarization selector 12. Such pulses are thus reflected from the selective reflector 10 and therefore give rise to a selective laser action, that is for the high-intensity pulses alone. The most intense pulses are thereby amplified preferentially with respect to the weaker ones, as shown in FIG. 6 by way of example only (pulses S2, S3).

Figure 7:
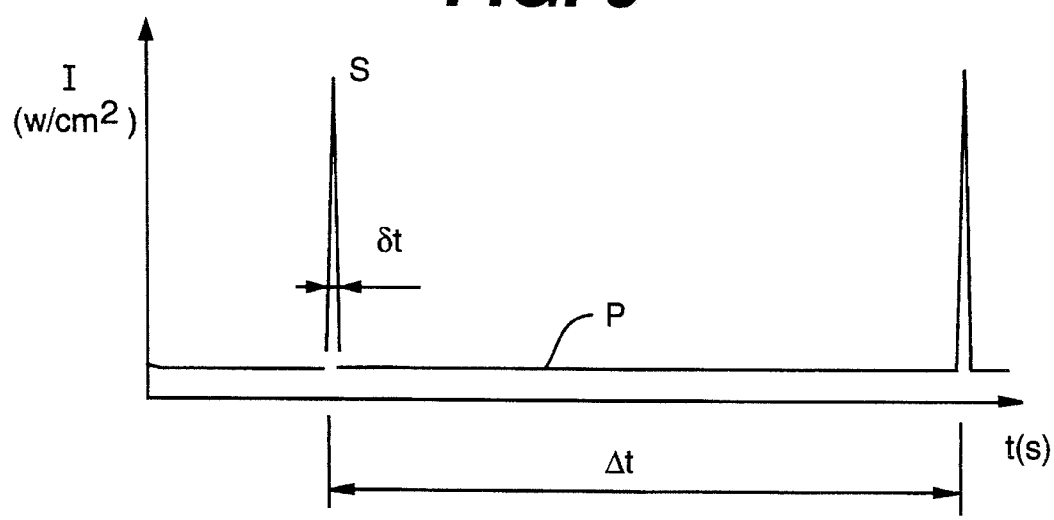
FIG. 7 is a diagram of the luminous intensity emitted from the active fibre under normal conditions, in the presence of non-linearity effects and pulsated emission.

The amplification of the most intense pulses within the active fibre 12 causes an important transition to the base level of the excited erbium atoms, thereby subtracting them to the amplification of the weaker pulses that are therefore progressively attenuated as far as they become zero. After a transient of some tens of μs, a stable operating condition is therefore established in which a train of pulses S repeating at a constant frequency is generated, as shown in FIG. 7, which differentiates from a pedestal emission P of intensity 5% lower than the maximum pulse intensity.

It should be noted that the known systems of soliton emission (NALM) previously cited and based on the path switching effect within the unidirectional loop usually exhibit, to the applicant's knowledge, a pedestal emission of intensity 10% higher than the maximum intensity of the emitted pulses. The reduced value of the pedestal emission found in the laser of the invention is deemed to be due to a greater sensitivity to polarization of the polarization-selective reflector, and more generally of the optical component with transmissiveness depending on polarization, in the presence of the above described non-linear phenomena, relative to the path switching selectivity of a directional coupler. The pulse emission frequency defined by the time gap Δt between one pulse and the other is correlated with the light travelling time in the loop, that is its linear course.

To the ends of the present invention, the isolator 13 and polarization selector 12 can be disposed at all events within the loop included between the fibre 7 inlet for connection with the direction coupler 8 and the selective reflector 10. The pump laser and related dichroic coupler 4 can be also disposed in connection with either end of the active fibre 2, provided that the pumping energy is supplied to the active fibre itself without important attenuations.

Figure 8:
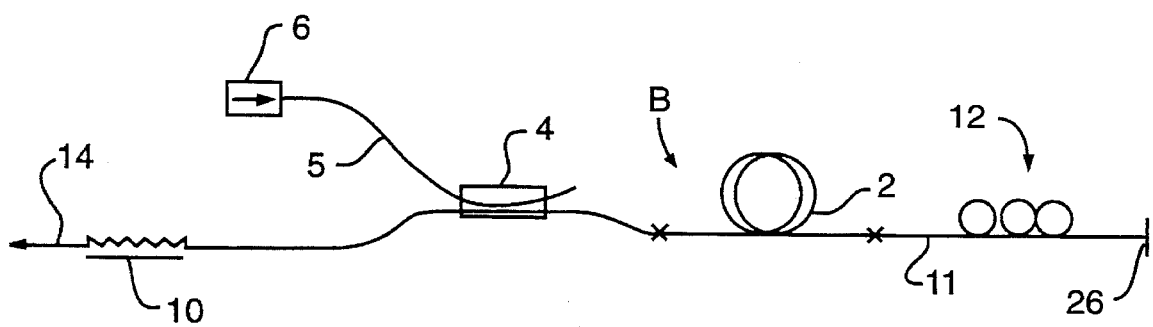
FIG. 8 is a diagram of a laser device of the invention, according to an alternative embodiment with respect to FIG. 1.
Figure 9:
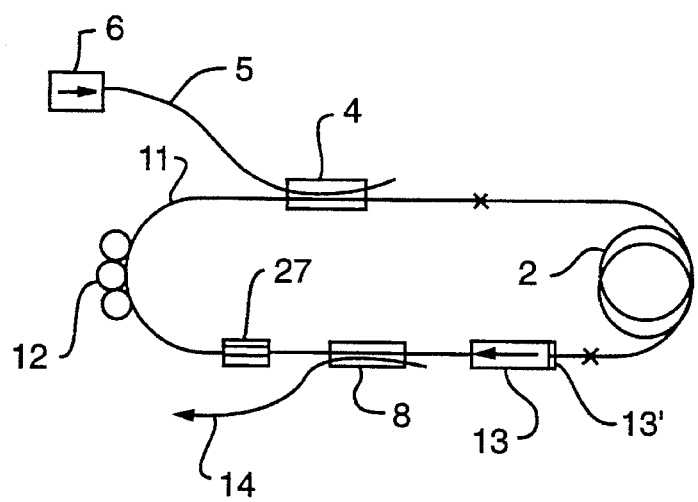
FIG. 9 is a diagram of a laser device of the invention, according to a further alternative embodiment thereof.

A similar result to the ends of the invention is achieved with laser devices having different configurations, such as those shown in FIGS. 8 and 9 in which corresponding elements have been allocated the same reference numerals as in FIG. 1. In the laser shown in FIG. 8, the configuration is of a linear type, the so-called steady-wave type, and a wideband reflecting element 26 is employed therein. This element together with the selective reflector 10 defines an optical fibre path B in which at least one portion of the signal emitted at one end of the active fibre is sent back to the opposite end thereof.

The wideband reflector 26 may consist of a reflecting element in microoptics, that is a fibre loop closed upon itself by a directional coupler or the like. The outgoing fibre 14 in this case is connected to the trailing fibre of the selective reflector 10, thereby enabling extraction from the laser and emission of the signal fraction that is not reflected thereby.

In this device as well, the emission of the active fibre 2 possesses a polarization state that is rotated by turns 12 and fibre 11, thereby causing an overall polarization rotation through 90° of the signal travelling over the optical path B. As a result, the reflected component from the selective reflector 10, after travelling through the whole optical path, comes back to the reflector 10 with such a polarization state that, in case of a low-intensity signal (that is having a low pumping power), the signal component possessing a polarization plane adapted to be reflected from the selective reflector 10 travels back along the optical path B and is rotated again through 90° so that it arrives at the reflector 10 again with a polarization plane in which no reflection occurs, thereby generating the complete absence of laser emission.

In the same manner as above described with reference to FIG. 1, by employing a pumping power supplied to the active fibre 2 higher than the stated minimum value and keeping the features of the fibres and components present in the laser cavity to the polarization conditions corresponding to the absence of emissions at a low pump and signal power, the occurrence of non-linear phenomena of variation of the refraction index in the fibre depending on the luminous intensity of the signal travelling over it produces the selective amplification of the only high-intensity pulses, thereby giving rise to the desired "ultrashort" pulses of high power. In the linear laser device of FIG. 8 too, the mutual arrangement of the polarization selector 12 and active fibre 2, as well as the end connecting the active fibre to the dichroic coupler 4 can be modified without important variations in the achieved result.

FIG. 9 shows a further embodiment in which the laser is in the form of a closed circuit so that the outgoing signal at one end of the fibre 2 is sent back to the opposite end of the fibre 2 itself through the fibre 11. In this arrangement, instead of the Bragg grating reflector 10 of FIGS. 1 and 8, an element responsive to polarization is employed which consists of an optoisolator of a type responsive to polarization. Isolators of this kind are commercially available, for example from the above mentioned producer. Alternatively, as diagrammatically shown in the figure, an optoisolator non-responsive to polarization 13 may be employed in association with a polarizer 13' (the placement of which in the laser cavity may be independent of the position of the isolator 13). The wavelength selectivity is obtained through a filter 27 consisting for example of a fibre portion involving two cores optically coupled in the desired wavelength band (the features of which are well known to a person of ordinary skill in the art) by which only a restricted wavelength band is transmitted to the cavity.

It will be apparent to those skilled in the art that various modifications and variations can be made to the present invention without departing from the spirit or scope of the present invention. Thus, it is intended that the present invention cover the modifications and variations of this invention provided they come within the scope of the appended claims and their equivalents.

What is claimed is:

1. An active-fibre passively-mode-locked laser generator comprising:
   an active optical fibre doped with a fluorescent dopant;
   means for feeding luminous pumping energy to one end of the active fibre to excite the active-fibre fluorescent dopant to a laser emission state, said dopant decaying from said laser emission state to a base state to generate a luminous emission signal at a predetermined wavelength, said emission signal having pulses of different peak powers depending on said pumping energy;
   polarization control means for orienting polarization of said emission signal in a predetermined plane;
   feedback means optically coupled to ends of said active fibre for passing at least a portion of said emission signal between said ends;
   at least one optical component with transmissiveness depending on polarization; and
   means for extracting said emission signal from said active fibre, at least the active fibre, polarization control means, feedback means and optical component with transmissiveness depending on polarization comprising an optical fibre path in which said emission signal propagates and in which at least one portion of the emission signal present at one end of the active fibre is sent back to the interior of said fibre, the components of said optical path having an orientation to cause a rotation of the polarization of said emission signal, said rotation having an angle corresponding to extinction of the emission signal within said optical component with transmissiveness depending on polarization and to consequent absence of emission signal in said extracting means for pumping energy lower than a predetermined value, said rotation having an angle corresponding to transmission with low losses within said optical component of pulses of high peak power of the emission signal for pumping energy of higher power than said predetermined value.

2. The active-fibre passively-mode-locked laser generator according to claim 1, wherein the means for supplying luminous pumping energy comprises a dichroic coupler having a first inlet, a second inlet, and an outlet, a laser emitter of a pumping wavelength connected through a respective optical fibre to the first inlet, said emission signal coupled to the second inlet and said pumping energy and emission signal coupled to the outlet.

3. The active-fibre passively-mode-locked laser generator according to claim 1, wherein said predetermined value of the pumping power is included within an adjustment field of emission power of the pumping laser emitter.

4. The active-fibre passively-mode-locked laser generator according to claim 1, wherein said predetermined value of the pumping power is in the range of 7 to 10 mW.

5. The active-fibre passively-mode-locked laser generator according to claim 1, wherein said polarization control means of said emission signal travelling through said active fibre comprises at least one optical-fibre turn, serially connected in said optical fibre path, with a lying plane of adjustable orientation relative to a remaining portion of the optical path.

6. The active-fibre passively-mode-locked laser generator according to claim 1, wherein said polarization control means of said emission signal travelling through said active fibre comprises a liquid-crystal polarization controller.

7. The active-fibre passively-mode-locked laser generator according to claim 1, wherein said polarization control means of said emission signal travelling through said active fibre comprises a planar-optics polarization controller.

8. The active-fibre passively-mode-locked laser generator according to claim 1, wherein said optical component having transmissiveness depending on polarization has a polarization selectivity greater than 10%.

9. The active-fibre passively-mode-locked laser generator according to claim 8, wherein said optical component with transmissiveness depending on polarization is a Bragg grating reflector.

10. The active-fibre passively-mode-locked laser generator according to claim 8, wherein said optical component with transmissiveness depending on polarization is a polarizer.

11. The active-fibre passively-mode-locked laser generator according to claim 1, wherein the optical fibre path comprises an active fibre having one end connected to one inlet of a directional coupler, said coupler having a second inlet connected to a second end of the active fibre, one outlet connected to a selective reflector with transmissiveness depending on polarization, and a second outlet comprising the extraction means of said emission signal, a unidirectional optoisolator being interposed between said first and second inlets of said directional coupler in series with said active fibre, said means for controlling and adjusting the polarization rotation being interposed in said optical fibre path at an intermediate position between one of said active-fibre ends and said selective reflector, and the means for supplying pumping energy being serially interposed within said optical fibre path and coupled to one of said ends of said active fibre.

12. The active-fibre passively-mode-locked laser generator according to claim 11, wherein the optical fibre path comprises an active fibre connected in a closed circuit comprising the means for controlling and adjusting the polarization rotation, a polarizer, a unidirectional optoisolator, means for supplying pumping energy connected to one of said ends of said active fibre, and a directional coupler for extracting the emission signal.

13. The active-fibre passively-mode-locked laser generator according to claim 1, wherein the optical fibre path comprises an active fibre having one end connected to a wideband reflector and a second end connected to the inlet of the selective reflector with transmissiveness depending on polarization, the means for controlling and adjusting the polarization rotation being inserted within the optical path at an intermediate position between the selective reflector and wideband reflector, and the means for supplying pumping energy being serially interposed within said optical fibre path and coupled to one of said ends of said active fibre.

14. The active-fibre passively-mode-locked laser generator according to claim 13, wherein the means for controlling and adjusting the polarization rotation are inserted within the optical path, between the active fibre and wideband reflector.

15. The active-fibre passively-mode-locked laser generator according to claim 1, wherein said fluorescent dopant of said active fibre is erbium.

16. The active-fibre passively-mode-locked laser generator according to claim 15, wherein said means for supplying luminous pumping energy has an emission pumping wavelength of 980 nm.

17. The active-fibre passively-mode-locked laser generator according to claim 15, wherein said predetermined wavelength of said emission signal is in the range of 1530 to 1560 nm.

18. A method of generating passively-mode-locked stimulated pulses in an optical-fibre laser generator having an active optical fibre doped with a fluorescent dopant, means for feeding luminous pumping energy to the active fibre to excite the fluorescent dopant to a laser emission state, said dopant decaying from said laser emission state to a base state to generate a luminous emission signal at a predetermined wavelength, a polarization control means for orienting the polarization of said emission signal in a predetermined plane, feedback means optically connected to ends of said active fibre for passing at least a portion of said emission signal between said ends, at least one optical component with transmissiveness depending on polarization, and means for extracting said emission signal from said active fibre, at least the active fibre, polarization control means, feedback means and optical component with transmissiveness depending on polarization comprising of an optical fibre path, in which said emission signal propagate and in which at least one portion of the emission signal present at one end of the active fibre is sent back to the interior of said fibre, comprising the steps of:

(1) adjusting said polarization control means to a configuration causing an absence of an emission signal coming out of said extracting means in a linear propagation condition of the emission signal within said optical path; and (2) supplying said active fibre with a pumping power corresponding to the stimulated emission in the active fibre of an emission signal having a luminous power higher than a predetermined value corresponding to non-linear luminous-propagation conditions of the emission signal in the optical path, while keeping the configuration of the polarization control means constant.

19. The method of generating stimulated passively-mode-locked pulses according to claim 18, wherein said polarization control means comprises at least one optical-fibre turn capable of spatial orientation, serially connected in said optical fibre path, arrangement of the polarization control means to cause the absence of an emission signal from said signal extraction means being accomplished by varying the orientation of said at least one optical-fibre turn.

20. A method of generating passively-mode-locked stimulated pulses in an optical-fibre laser generator having an active optical fibre doped with a fluorescent dopant, means for feeding luminous pumping energy to the active fibre to excite the fluorescent dopant to a laser emission state, said dopant decaying from said laser emission state to a base state and generating a luminous emission signal at a predetermined wavelength, a polarization control means for orienting the polarization of said emission signal in a predetermined plane, feedback means optically connected to ends of said active fibre for passing at least a portion of said emission signal between said ends, at least one optical component with transmissiveness depending on polarization, and means for extracting said emission signal from said active fibre, at least the active fibre, polarization control means, feedback means and optical component with transmissiveness depending on polarization comprising of an optical fibre path, in which said emission signal propagate and in which at least one portion of the emission signal present at one end of the active fibre is sent back to the interior of said fibre, comprising the steps of:

(1) supplying said active fibre with a pumping power corresponding to the stimulated emission in the active fibre of an emission signal having a luminous power lower than a predetermined value corresponding to linear luminous-propagation conditions of the emission signal in the optical path;

(2) controlling the presence of said emission signal coming out of said extraction means;

(3) adjusting said polarization control means in a configuration causing an absence of an emission signal coming out of said extraction means; and (4) increasing the pumping power supplied to said active fibre as far to overcome a second predetermined value, which value corresponds to non-linear luminous-propagation conditions of the emission signal in the optical path in which the polarization of the emission signal is rotated at right angles to that in said linear propagation conditions, while keeping the configuration of the polarization control means constant.

21. The method of generating stimulated passively-mode-locked pulses according to claim 20, wherein the pumping power is adjustable between predetermined minimum and maximum values, said minimum value being lower than a value corresponding to the stimulated emission of said active fibre propagating in a linear condition in said optical path and said maximum value being higher than a value corresponding to a stimulated emission in said active fibre propagating in non-linear conditions in the optical path, the polarization of the emission signal in non-linear conditions being rotated at right angles to the polarization in said linear propagation conditions.

22. The method of generating stimulated passively-mode-locked pulses according to claim 21, wherein said predetermined minimum value of the pumping power is lower than or equal to 7 mW.

23. The method of generating stimulated passively-mode-locked pulses according to claim 21, wherein said predetermined maximum value of the pumping power is greater than or equal to 10 mW.

* * * * *